(12) United States Patent
Putilin et al.

(10) Patent No.: US 11,703,689 B2
(45) Date of Patent: Jul. 18, 2023

(54) DEVICE FOR ENLARGING EXIT PUPIL AREA AND DISPLAY INCLUDING THE SAME

(71) Applicant: SAMSUNG ELECTRONICS CO., LTD., Suwon-si (KR)

(72) Inventors: Andrey N. Putilin, Moscow (RU); Aleksander V. Morozov, Podolskiy district (RU); Vladislav V. Druzhin, Moscow (RU); Sergey E. Dubynin, Moscow (RU); Kseniia I. Lvova, Velikie Luki (RU); Polina I. Malinina, Moscow (RU); Sergey S. Kopenkin, Moscow (RU); Yurii P. Borodin, Moscow (RU); Anastasiia S. Perevoznikova, Izhevsk (RU); Bongsu Shin, Seoul (KR); Sunil Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 92 days.

(21) Appl. No.: 17/090,999

(22) Filed: Nov. 6, 2020

(65) Prior Publication Data

US 2021/0149208 A1   May 20, 2021

(30) Foreign Application Priority Data

Nov. 15, 2019   (RU) .......................... RU2019136751
Jun. 4, 2020   (KR) ........................ 10-2020-0067855

(51) Int. Cl.
    *G02B 27/01*   (2006.01)
(52) U.S. Cl.
    CPC ..... *G02B 27/0179* (2013.01); *G02B 27/0172* (2013.01); *G02B 2027/013* (2013.01);
    (Continued)

(58) Field of Classification Search
    CPC ............ G02B 27/0179; G02B 27/0172; G02B 27/0081; G02B 27/0101;
    (Continued)

(56) References Cited

U.S. PATENT DOCUMENTS 6,829,095 B2   12/2004   Amitai
8,320,032 B2   11/2012   Levola
(Continued)

FOREIGN PATENT DOCUMENTS

CN   109459813 A   3/2019
EP   3311247 B1   3/2019
(Continued)

OTHER PUBLICATIONS

Communication dated Jan. 15, 2020 by the Russian Patent Office in Russian Patent Application No. 2019136751/28(072574).
(Continued)

*Primary Examiner* — William Boddie
*Assistant Examiner* — Kebede T Teshome
(74) *Attorney, Agent, or Firm* — Sughrue Mion, PLLC

(57) ABSTRACT

Provided is a device configured to enlarge an exit pupil area of a visual optical apparatus, the device including a diffraction grating configured to output a plurality of diffracted light beams of a plurality of diffraction orders by diffracting an incident light beam, and a waveguide provided on the diffraction grating and configured to form an exit pupil based on a first diffracted light beam among the plurality of diffracted light beams output from the diffraction grating and to form exit pupil orders based on a second diffracted light beam among the plurality of diffracted light beams output from the diffraction grating.

20 Claims, 12 Drawing Sheets

(52) U.S. Cl.
CPC ............... *G02B 2027/0123* (2013.01); *G02B 2027/0178* (2013.01); *G02B 2027/0187* (2013.01)

(58) Field of Classification Search
CPC ...... G02B 2027/0123; G02B 2027/013; G02B 2027/0178; G02B 2027/0187; G02B 2027/0125
See application file for complete search history.

(56) References Cited

U.S. PATENT DOCUMENTS

| | | | |
|---|---|---|---|
| 8,508,848 | B2 | 8/2013 | Saarikko |
| 9,977,493 | B2 | 5/2018 | Lanier et al. |
| 10,222,615 | B2 | 3/2019 | Lowney et al. |
| 10,895,685 | B2 | 1/2021 | Huang et al. |
| 2014/0140653 | A1 | 5/2014 | Brown et al. |
| 2016/0238844 | A1* | 8/2016 | Dobschal ........... G02B 27/4216 |
| 2017/0131552 | A1* | 5/2017 | Yokoyama ........... G02B 5/1866 |
| 2017/0235142 | A1* | 8/2017 | Wall ......... G02B 5/26 359/633 |
| 2019/0101760 | A1 | 4/2019 | Ayres et al. |
| 2019/0187465 | A1 | 6/2019 | Erler et al. |
| 2020/0117004 | A1* | 4/2020 | Qin ...................... G02B 5/3083 |

FOREIGN PATENT DOCUMENTS

| | | |
|---|---|---|
| KR | 10-1893590 B1 | 8/2018 |
| WO | 2008/14927 A1 | 12/2008 |

OTHER PUBLICATIONS

Communication dated Mar. 17, 2021 by the European Patent Office in European Patent Application No. 20207618.8.

Shin, Bongsu et al., "Eye-box expansion using waveguide and holographic optical element for augmented reality head-mounted display", Proceedings, vol. 11310, Optical Architectures for Displays and Sensing in Augmented, Virtual, and Mixed Reality (AR, VR, MR); 113100F (2020).

White Paper Digilens Waveguide Hud Technology, Jul. 20, 2016, XP055615979. (16 pages total).

* cited by examiner

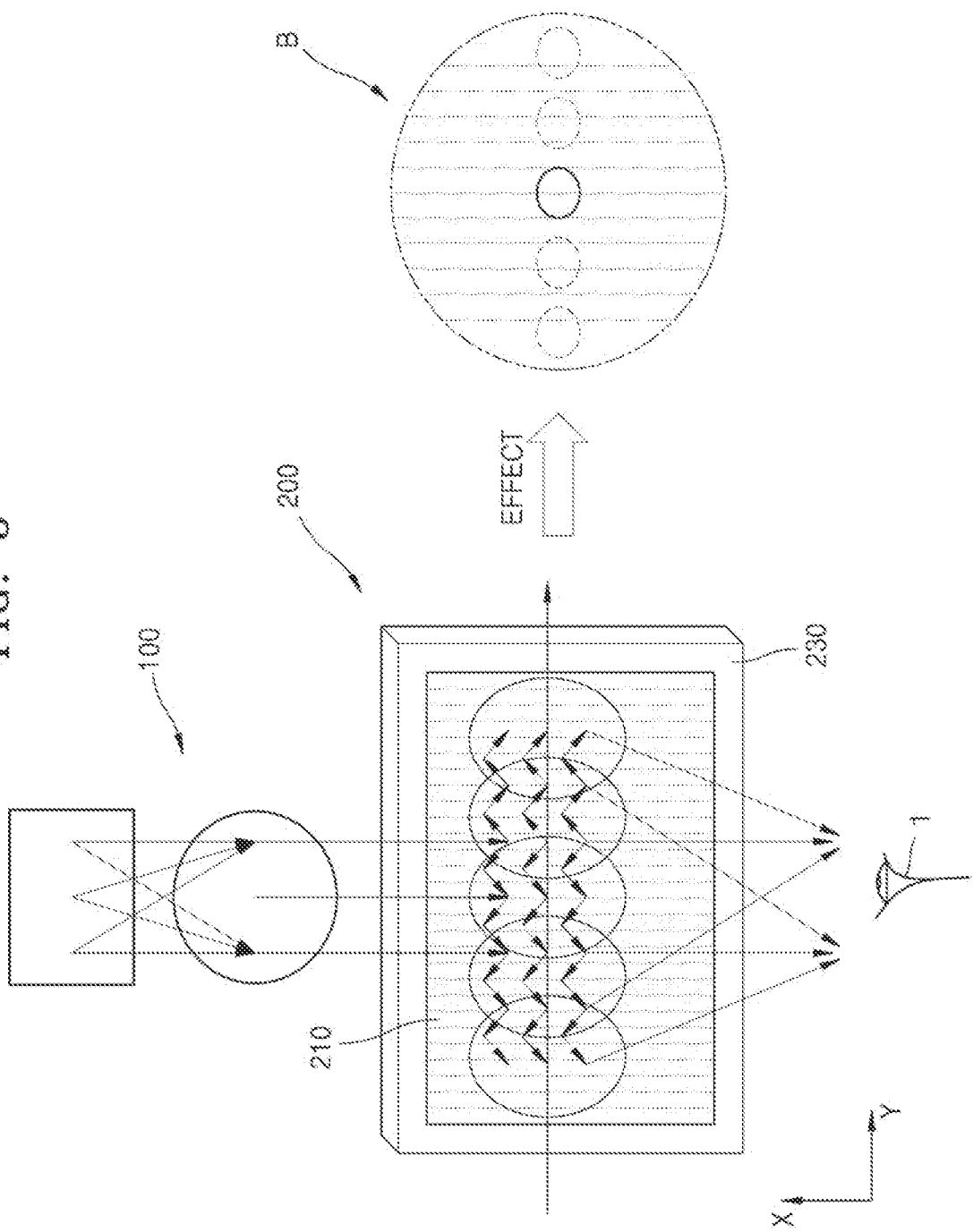

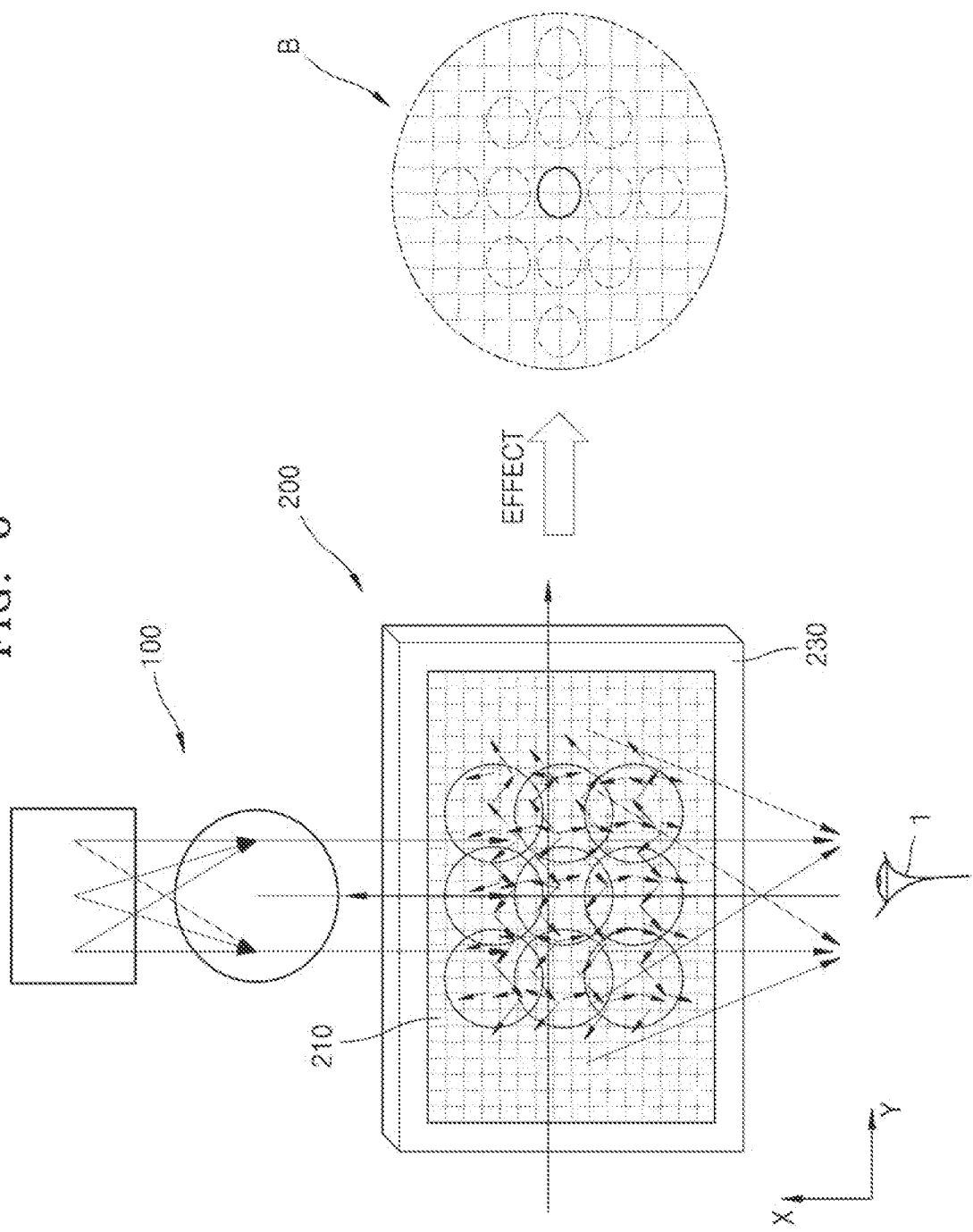

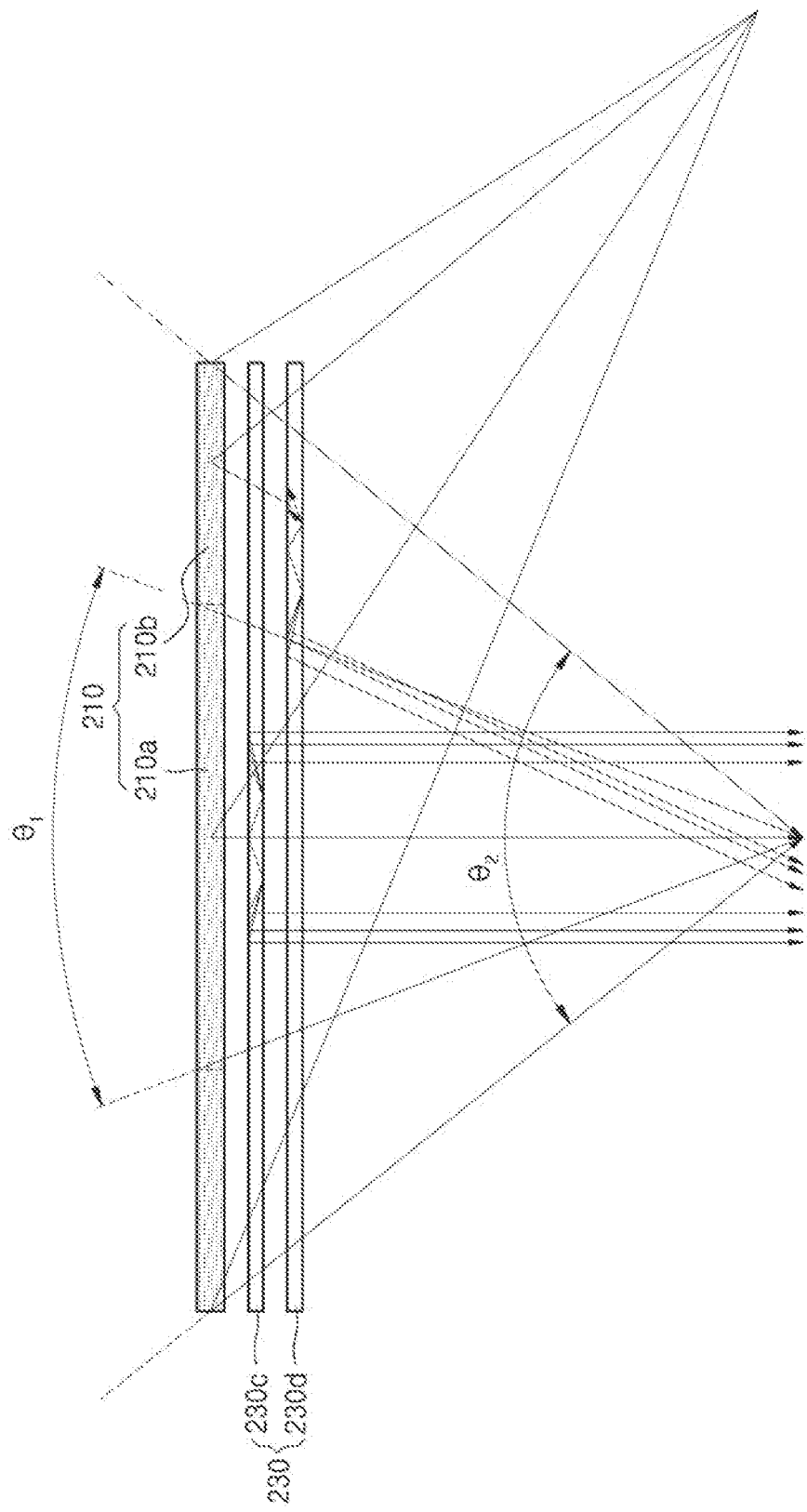

US 11,703,689 B2

DEVICE FOR ENLARGING EXIT PUPIL AREA AND DISPLAY INCLUDING THE SAME

CROSS-REFERENCE TO RELATED APPLICATION

This application claims priority to Russian Patent Application No. 2019136751, filed on Nov. 15, 2019 in the Russian Federal Service for Intellectual Property, and Korean Patent Application No. 10-2020-0067855, filed on Jun. 4, 2020 in the Korean Intellectual Property Office, the disclosures of which are incorporated herein in their entireties by reference.

BACKGROUND

1. Field

Example embodiments of the present disclosure relate to an optical device for enlarging the eye box of a visual optical apparatus and a display including the optical device.

2. Description of Related Art

Visual optical apparatuses such as augmented reality (AR) devices, eyepieces, and lenses of optical devices (microscopes, telescopes, sights, etc.) have been markedly improved. The most important characteristic parameters of such visual optical apparatuses are the size of a field of view (FoV) and the size of an eye box. According to an analysis of the related art, it is very difficult to impart a wide field of view (for example, about 60° or greater) and a large eye box (for example, about 3 mm or greater) to a visual optical apparatus while guaranteeing required image-quality or resolution (for example, a resolution equal to about 1 arc minute not greater than the angular resolution limit of the eye). Generally-known devices for enlarging an eye box are not common because complex elements are used therein. However, it is necessary to separately design an eye box enlarging device for each visual optical apparatus.

In the related art, an exit pupil expander may include a waveguide, and light (radiation) may be incident on the waveguide through diffractive elements and may be output from the waveguide through the diffractive elements while propagating in the waveguide. The exit pupil expander described above may enlarge a field of view without using a material having a high refractive index. However, the field of view enlarged by the exit pupil expander has a relatively small width (the horizontal size of the field of view is limited), and the exit pupil expander has a complex structure with large overall dimensions. In addition, since light propagates a large distance in the waveguide of such an exit pupil expander, significant energy loss occurs. In addition, since various diffractive elements are used in such an exit pupil expander for receiving and outputting light, the diffraction efficiency, uniformity, and brightness of resulting images may be limited.

A substrate-guided optical beam expander of the related art may be a waveguide device configured to provide light within a field of view by using a translucent mirror. The size of an exit pupil is related to the geometric parameters of the expander, particularly, the thickness of a waveguide and the number of mirror elements. A drawback of such an expander is that the waveguide has a significant thickness, and thus the expander has a markedly increased size and a complex design. Furthermore, even when such an expander is used, a sufficient field of view cannot be obtained.

SUMMARY

One or more example embodiments provide devices capable of enlarging an eye box for providing a wide exit pupil area while maintaining a wide field of view, high diffraction efficiency, and image uniformity and brightness of a visual optical apparatus.

One or more example embodiments also provide small and universal devices for enlarging an exit pupil area with less energy loss of incident light.

One or more example embodiments also provide devices for enlarging an exit pupil area which are applicable to various visual optical apparatuses.

Additional aspects will be set forth in part in the description which follows and, in part, will be apparent from the description, or may be learned by practice of example embodiments.

According to an aspect of an example embodiment, there is provided a device configured to enlarge an exit pupil area of a visual optical apparatus, the device including a diffraction grating configured to output a plurality of diffracted light beams of a plurality of diffraction orders by diffracting an incident light beam, and a waveguide provided on the diffraction grating, the waveguide being configured to form an exit pupil based on a first diffracted light beam among the plurality of diffracted light beams output from the diffraction grating and to form exit pupil orders based on a second diffracted light beam among the plurality of diffracted light beams output from the diffraction grating.

The waveguide may be further configured to form the exit pupil based on outputting, without total internal reflection, the first diffracted light beam output from the diffraction grating.

The waveguide may be further configured to form at least one exit pupil order based on the second diffracted light beam output from the diffraction grating that is totally internally reflected at least once and output from the waveguide.

The waveguide may be further configured to return the second diffracted light beam to the diffraction grating by totally internally reflecting the second diffracted light beam, the diffraction grating may be further configured to diffract the returned second diffracted light beam into a plurality of diffracted light beams, and the waveguide may be further configured to form the exit pupil orders based on outputting some diffracted light beams of the plurality of diffracted light beams obtained by diffracting the returned second diffracted light beam and reflecting a remaining diffracted light beams of the plurality of diffracted light beams, that are not output, back to the diffraction grating.

The waveguide may include a first surface on which the diffraction grating is provided, and a second surface opposite to the first surface and configured to output the first diffracted light beam to the outside of the waveguide.

The waveguide may be further configured to additionally form exit pupil orders until all diffracted light beams incident on the second surface are totally internally reflected.

A number of the exit pupil orders may be proportional to a number of times that diffracted light beams of the plurality of diffracted light beams incident on the second surface pass through the second surface.

A distance between the exit pupil orders may be proportional to a thickness of the waveguide.

A distance between the exit pupil orders may be inversely proportional to a refractive index of the waveguide.

The first diffracted light beam may include a 0 order diffracted light beam, and the second diffracted light beam may include at least one of a+1 order diffracted light beam and a−1 order diffracted light beam.

The waveguide may be further configured to form a first exit pupil order based on the +1 order diffracted light beam, and form a second exit pupil order based on the −1 order diffracted light beam.

The waveguide may be further configured to form the first exit pupil order and the second exit pupil order in different directions with respect to the exit pupil provided between the first exit pupil order and the second exit pupil order.

The diffraction grating may be further configured to diffract light beams that are incident at a predetermined aperture angle or less.

The aperture angle may be greater than an angle of view of the visual optical apparatus.

The waveguide may be a first waveguide, and the device may further include a second waveguide provided on the diffraction grating and configured to totally internally reflect light output from the diffraction grating.

The diffraction grating may be provided between the first waveguide and the second waveguide.

The diffraction grating may include a first diffraction region configured to diffract a light beam incident within a range of a first aperture angle or less, and a second diffraction region configured to diffract a light beam incident within a range of greater than the first aperture angle but less than or equal to a second aperture angle, wherein the waveguide further includes a first waveguide configured to form an exit pupil order based on a diffracted light beam output from the first diffraction region, and a second waveguide configured to form an exit pupil order based on a diffracted light beam output from the second diffraction region.

The diffraction grating, the first waveguide, and the second waveguide may be sequentially provided in a propagation direction of the incident light beam.

The waveguide may include a curved waveguide.

The diffraction grating may include a Bragg diffraction grating.

According to another aspect of an example embodiment, there is provided a display including a visual optical apparatus configured to output a light beam with a given angle of view, and a device configured to expand an exit pupil area of the visual optical apparatus, the device including a diffraction grating configured to output a plurality of diffracted light beams of a plurality of diffraction orders by diffracting an incident light beam, and a waveguide provided on the diffraction grating, the waveguide configured to form an exit pupil based on a first diffracted light beam among the plurality of diffracted light beams output from the diffraction grating and to form exit pupil orders based on a second diffracted light beam among the plurality of diffracted light beams output from the diffraction grating.

The display may be a near-eye display.

According to yet another aspect of an example embodiment, there is provided a device for enlarging an exit pupil area of a visual optical apparatus, the device including a diffraction grating configured to output a plurality of diffracted light beams of a plurality of diffraction orders by diffracting an incident light beam, and a waveguide provided on the diffraction grating, the waveguide configured to form an exit pupil based on a first diffracted light beam among the plurality of diffracted light beams that is output from the diffraction grating without total internal reflection, and form at least one exit pupil order based on a second diffracted light beam among the plurality of diffracted light beams that is output from the diffraction grating and is totally internally reflected at least once in the waveguide.

The first diffracted light beam may be a 0 order diffracted light beam output from the diffraction grating, and the second diffracted light beam may be a+1 order or −1 order diffracted light beam output from the diffraction grating that is totally internally reflected in the waveguide and diffracted by the diffraction grating as a 0 order light beam.

BRIEF DESCRIPTION OF THE DRAWINGS

The above and/or other aspects, features, and advantages of certain example embodiments will be more apparent from the following description taken in conjunction with the accompanying drawings, in which:

FIG. 5 is a view schematically illustrating an exit pupil expander including a one-dimensional diffraction grating according to an example embodiment;

FIG. 6 is a view schematically illustrating an exit pupil expander including a two-dimensional diffraction grating according to an example embodiment;

FIG. 11 illustrates an exit pupil expander including a plurality of waveguides according to another example embodiment.

DETAILED DESCRIPTION

Figure 1:
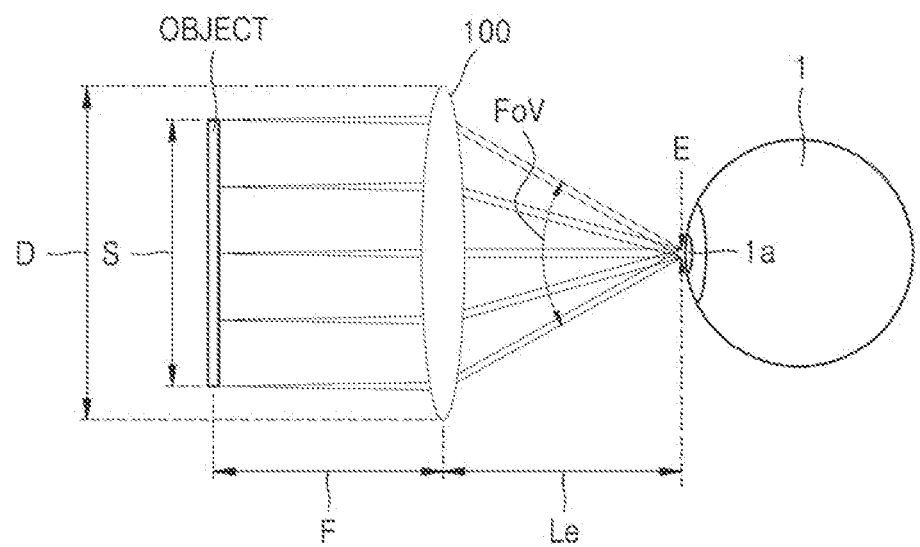
FIG. 1 illustrates a telecentric ray path in an object space.

Reference will now be made in detail to example embodiments of which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Hereinafter, example embodiments will be described with reference to the accompanying drawings. The example embodiments described herein are for illustrative purposes only, and various modifications may be made therein. In the drawings, like reference numerals refer to like elements, and the sizes of elements may be exaggerated for clarity of illustration.

In the following description, when an element is referred to as being "above" or "on" another element, it may be directly on the other element while making contact with the other element or may be above the other element without making contact with the other element.

Although the terms "first" and "second" are used to describe various elements, these terms are only used to distinguish one element from another element. These terms do not limit elements to having different materials or structures.

The terms of a singular form may include plural forms unless otherwise mentioned. It will be further understood that the terms "comprises" and/or "comprising" used herein specify the presence of stated features or elements, but do not preclude the presence or addition of one or more other features or elements.

An element referred to with the definite article or a demonstrative pronoun may be construed as the element or the elements even though it has a singular form.

Operations of a method may be performed in appropriate order unless explicitly described in terms of order or described to the contrary. In addition, examples or exemplary terms (for example, "such as" and "etc.") are used for the purpose of description and are not intended to limit the scope of the inventive concept unless defined by the claims.

According to example embodiment, a small device for enlarging an eye box (also called an "exit pupil area") by using a waveguide and a diffraction grating such as a diffractive optical element (DOE) or a holographic optical element (HOE) used for receiving or outputting light may be provided.

The device according to an example embodiment may be used to enlarge an eye box of a visual optical apparatus such as an eyepiece of an optical device. An eyepiece of an optical device is an element configured to face the viewer's eye and may be a part of an optical device, for example, a viewfinder, a range finder, binoculars, a microscope, or a telescope, designed for a viewer to view images formed by a lens or main mirror of the optical device.

The device according to an example embodiment for enlarging an eye box may be applied to an augmented reality (AR) device provided with an image combining apparatus that combines an environmental image with an image formed by an internal display using a visual optical apparatus or HOE/DOE.

The device according to an example embodiment for enlarging an eye box (hereinafter referred to as an "exit pupil expander") may be compact and universal. Here, compactness and universality are determined by only the diffraction grating which is an element used for receiving and outputting light, and the waveguide used in the proposed device is not required to be a high-quality waveguide.

The exit pupil expander according to an example embodiment may have a small overall dimension. That is, the device according to an example embodiment may not change the overall dimensions of a visual optical apparatus and may thus be used for various optical devices.

An exit pupil of a visual optical apparatus is an area for a viewer to view images. In other words, the exit pupil is a paraxial image of an aperture diaphragm in an image space, and the paraxial image may be formed by the next part of the visual optical apparatus in a direct course of light rays. These terms are well established in the field of optics. The main characteristic of an exit pupil of a visual optical apparatus is that the entire image field is at a certain point in the visual optical apparatus.

Increasing (enlarging) an exit pupil of a visual optical apparatus may include increasing the dimensions of the exit pupil (or the number of exit pupils) without increasing the longitudinal dimension of the visual optical apparatus. The size of exit pupils of classical optical systems may be increased, but in this case, the longitudinal sizes of visual optical apparatuses may also be increased. The use of a waveguide optical system in a visual optical apparatus may make it possible to increase the dimensions of an exit pupil of the visual optical apparatus without increasing the size of the visual optical apparatus.

Eye box may be an area that the pupil of the human eye is capable of accessing from any position when the eye pupil moves, and may be an exit pupil area including an exit pupil.

Field of view may be an angular space that the eye can see with the pupil and head being fixed. When the field of view is large, the eye may view most of an object space. However, when the pupil of the eye moves, for example, a few millimeters to a side, the field of view may be somewhat blocked, and the field of view may be reduced. The reason for this is that an eye box of a visual optical apparatus is small such that when the pupil of the eye moves, the eye box may not perfectly match the pupil of the eye or may not match the pupil of the eye at all.

Diffraction efficiency may be a characteristic of a diffraction grating and may be measured in percent or decimal fractions as the ratio of energy contained in one of diffraction orders to energy incident on the diffraction grating.

FIG. 1 illustrates a telecentric ray path in an object space. As illustrated in FIG. 1, a light beam output from a general visual optical apparatus 100 may form an exit pupil.

The size of the field of view FoV of the visual optical apparatus 100 may be determined according to Equation 1 below.

$$FoV = 2\arctg\left(\frac{S}{2F}\right) \quad \text{[Equation 1]}$$

Here, S refers to the size (unit: mm) of an object, F refers to the focal length (unit: mm) of a lens included in the visual optical apparatus 100, and FoV refers to the size of the field of view (unit: degree).

The size E of the exit pupil of the visual optical apparatus 100 may be determined by Equation 2 below.

$$E = D - 2Le\tan\left(\frac{FoV}{2}\right) \quad \text{[Equation 2]}$$

Here, E refers to the size (mm) of the exit pupil, Le refers to an eye-relief distance (mm) from the visual optical apparatus 100 to the pupil 1*a* of the eye 1, D refers to the diameter (mm) of a clear lens included in the visual optical apparatus 100.

As shown in Equations 1 and 2, when an exit pupil expander according to an example embodiment is not applied to the visual optical apparatus 100, the size E of the exit pupil may be not limited by the field of view FoV, and the field of view FoV may be limited by the focal length F of the visual optical apparatus 100 and the size S of the object. The larger the region of an object space, for example, an object, that a user wants to view, the larger the field of view FoV. However, the focal length F of the lens included in the visual optical apparatus 100 needs to be smaller as a device such as AR glasses becomes smaller.

According to Equations 1 and 2, there is generally an inverse relationship between the size of a field of view FoV and the size E of exit pupil. In the visual optical apparatus 100, it is difficult to increase both the size of the field of view FoV and the size E of the exit pupil without using additional elements. A device for enlarging an eye box according to an example embodiment is more universal and compact.

Figure 2A:
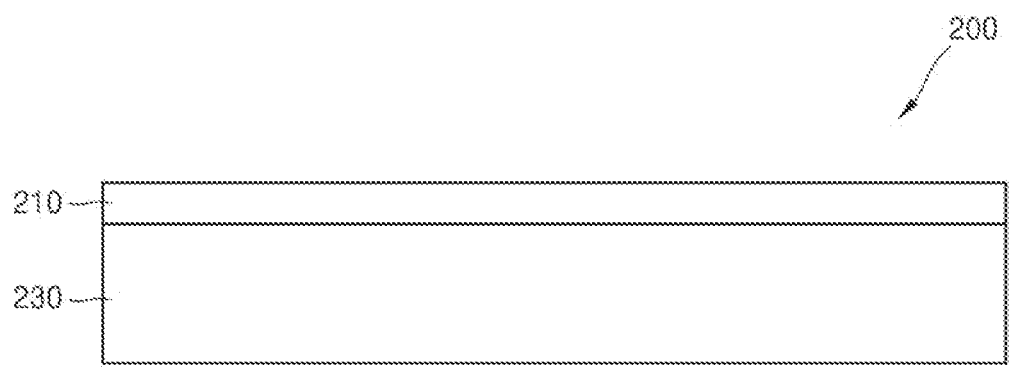
FIG. 2A illustrates an exit pupil expander for enlarging an eye box according to an example embodiment.

FIG. 2A illustrates an exit pupil expander 200 for enlarging an eye box according to an example embodiment. As illustrated in FIG. 2A, the exit pupil expander 200 may include a waveguide 230 and a diffraction grating 210. When the exit pupil expander 200 uses the diffraction grating 210, orders of diffraction are present only in the waveguide 230, and there is no diffraction order in free space.

The diffraction grating 210 may be designed according to a specific angle of incidence of light incident on the diffraction grating 210. The angle of incidence may be determined by an aperture angle of the visual optical apparatus 100, that is, an angle of view of the visual optical apparatus 100. For example, light is output from the visual optical apparatus 100 at a specific angle with respect to an optical axis, and may be incident on the diffraction grating 210 at the same angle as the specific angle.

The diffraction grating 210 of the exit pupil expander 200 may be designed such that light incident on the diffraction grating 210 may be diffracted into three diffraction orders "0," "+1," and "−1." The diffraction orders may propagate into the waveguide 230.

The period of the diffraction grating 210 that satisfies the above conditions is as shown in Equation 3 below.

$$n_2\sin\theta_2 - n_1\sin\theta_1 = \frac{M\lambda}{d} = M\lambda T_1 \quad \text{[Equation 3]}$$

Here, $n_1$ refers to the refractive index of a medium in front of the exit pupil expander 200, for example, the refractive index of air, $n_2$ refers to the refractive index of the waveguide 230, M refers to the number of diffraction orders, and d refers to a grating period.

In addition, θ refers to the angle of incidence of light, that is, $\theta_1$ refers to the angle of incidence of light which enters the diffraction grating 210 from air, and $\theta_2$ refers to a diffraction angle indicating the angle at which an M order diffracted light beam proceeds from the diffraction grating 210 into the waveguide 230.

In addition, λ refers to the wavelength of light incident on the diffraction grating 210, and T refers to the frequency of the diffraction grating 210 which may be expressed by a reciprocal of the grating period, that is, T=1/d. When d is in millimeters (mm), T may be in dash/mm.

The diffraction grating 210 may be designed to enlarge an eye box according to Equation 3. Parameters of the diffraction grating 210 may be determined according to a specific operation to be performed by the diffraction grating 210. The parameters of the diffraction grating 210 may include the constant or variable period, the relief depth, the profile type (stroke), the stroke direction, and the like of the diffraction grating 210. According to an example embodiment, a specific operation to be performed by the diffraction grating 210 is to enlarge an eye box.

The parameters of the diffraction grating 210 may vary depending on the incident angle of a light beam incident on the diffraction grating 210 from the visual optical apparatus 100, the material of the waveguide 230 on which the diffraction grating 210 is arranged, and the target size of an eye box.

The operation of the diffraction grating 210 may be determined as follows.

When the diffraction grating 210 is in a hologram recording mode, the operation of the diffraction grating 210 may be determined by the ratio of the spatial arrangement of recording sources and the radiation power of the recording sources.

When the diffraction grating 210 is in a lithography recording mode, the operation of the diffraction grating 210 may be determined by the structure of the diffraction grating 210 which is determined by modeling and calculation.

According to preliminary theory and computer modeling, it may be demonstrated that when the parameters of the diffraction grating 210 and the waveguide 230 match each other, combinations of the parameters may act to enlarge an eye box.

That is, in the exit pupil expander 200, the parameters of the diffraction grating 210 may be designed to result in only three diffraction orders "0," "+1," and "−1." Light diffracted into diffraction orders other than "0" may be reflected at least once by a surface of the waveguide 230 under conditions of total internal reflection (TIR) and may propagate in the waveguide 230. A 0th order diffracted light beam ("0" order diffracted light) may be refracted at the interface between the waveguide 230 and air and be output from the exit pupil expander 200 without total internal reflection.

A key element of the exit pupil expander 200 may be the waveguide 230, and the waveguide 230 may allow incident light to travel in a waveguide mode. The waveguide mode may be a mode in which "+1" and "−1" order diffracted light beams are incident on the interface between the waveguide 230 and air at angles equal to or greater than a total reflection angle for being totally reflected. There is a relationship between the parameters of the waveguide 230 and the operation of the waveguide 230.

In an example embodiment, the waveguide 230 may have a small thickness such that light output from the waveguide 230 may be uniform, and in this case, the light may be uniform at an eye box which is an enlarged exit pupil area. For example, the thickness of the waveguide 230 may be about 3 mm or less.

Therefore, the parameters of the waveguide 230 and the diffraction grating 210 may match each other to obtain properties for enlarging an exit pupil area.

The diffraction grating 210 may be manufactured by methods which are well known in the art. For example, a relief diffraction grating may be manufactured using a mask or nanoimprinting method as the diffraction grating 210, or a holographic diffraction grating may be manufactured by an interference pattern recording method as the diffraction grating 210.

The diffraction grating 210 obtained by such a manufacturing or recording method may be applied to flat and non-flat waveguides. In general, the diffraction grating 210 may be applied to the waveguide 230 when manufacturing the exit pupil expander 200. The parameters of the diffraction grating 210 may be matched with the parameters of the waveguide 230 during a manufacturing process to increase light incident on the exit pupil expander 200 without changing the characteristics of light rays.

The diffraction grating 210 may be formed on the waveguide 230 by using a substrate coated with a photosensitive material. For example, the substrate may basically operate as the waveguide 230, and the diffraction grating 210 having a material and thickness for enlarging an eye box may be formed on the substrate. Parameters of the substrate may match the parameters of the diffraction grating 210.

A diffraction grating of a thin film type may be formed as the diffraction grating 210 by forming a diffraction grating on a photoresist material and then copying and transferring the diffraction grating to a photopolymer. A diffraction grating 210 of a thin film type may be applied to the waveguide 230. In this case, the parameters of the waveguide 230 and the parameters of the diffraction grating 210 may match each other as described above for enlargement of an eye box.

When manufacturing the exit pupil expander 200, the exit pupil expander 200 may be designed according to a specific angle of incidence which is determined by the aperture angle of the visual optical apparatus 100. Even when the aperture angle of the visual optical apparatus 100 is not equal to the aperture angle of the exit pupil expander 200, the exit pupil expander 200 may be integrated into the visual optical apparatus 100 and may be more accurately operated under the condition that the aperture angle of the visual optical apparatus 100 is equal to or less than the aperture angle of the exit pupil expander 200. This means that the exit pupil expander 200 provided according to an example embodiment for enlarging an eye box has universality. For example, the exit pupil expander 200 may have an angular range for accuracy in operation, and the angular range may be determined by the exit aperture angle of the visual optical apparatus 100.

For example, the exit pupil expander 200 may be designed for the visual optical apparatus 100 having an aperture angle of about 60° (an angle of view of about 60°). In this case, the exit pupil expander 200 may be used even for a visual optical apparatus having an aperture angle of less than about 60°, for example, about 40°. However, the exit pupil expander 200 having an aperture angle of about 60° may abnormally behave for a visual optical apparatus having an aperture angle (angle of view) of greater than about 60°. For example, the exit pupil expander 200 having an aperture angle of about 60° may not be used for a visual optical apparatus 100 having an aperture angle of greater than about 60°.

Figure 2B:
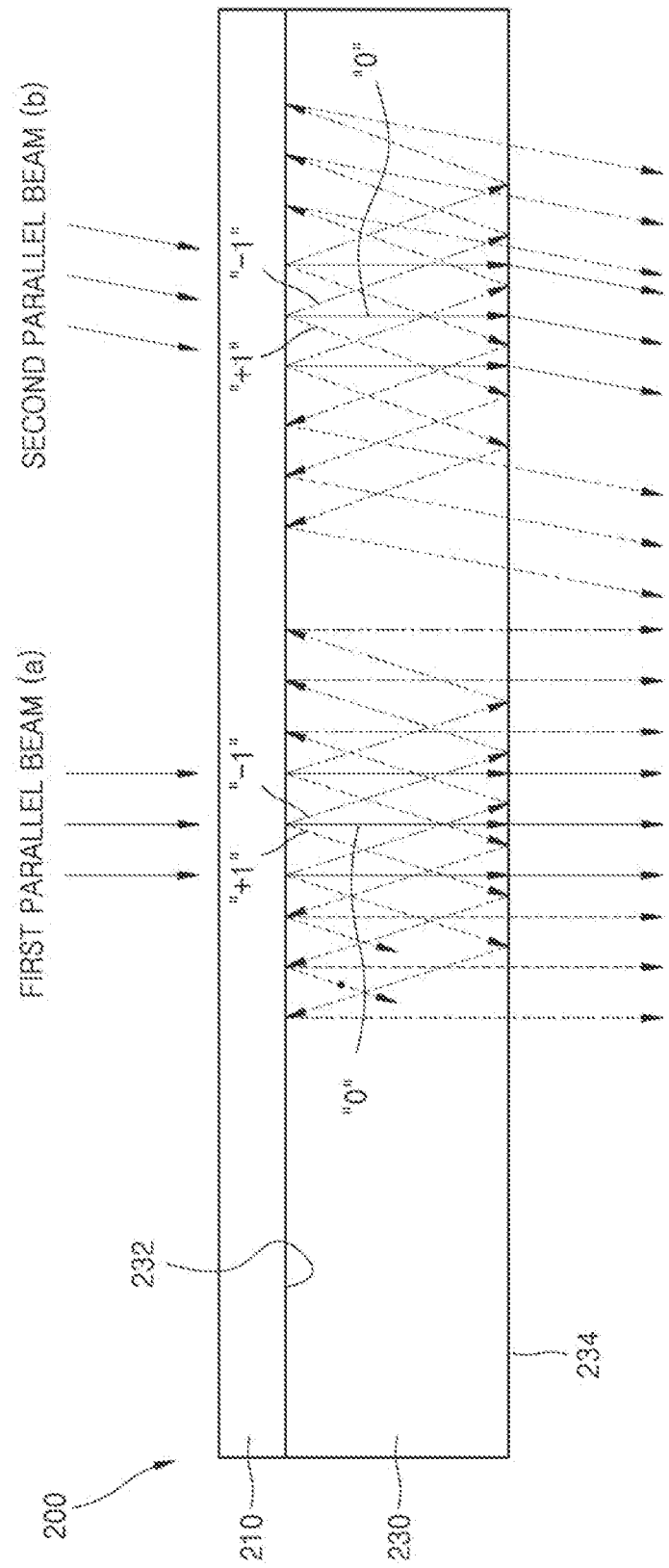
FIG. 2B illustrates the propagation of light in an exit pupil expander for enlarging an eye box according to an example embodiment.
Figure 2C:
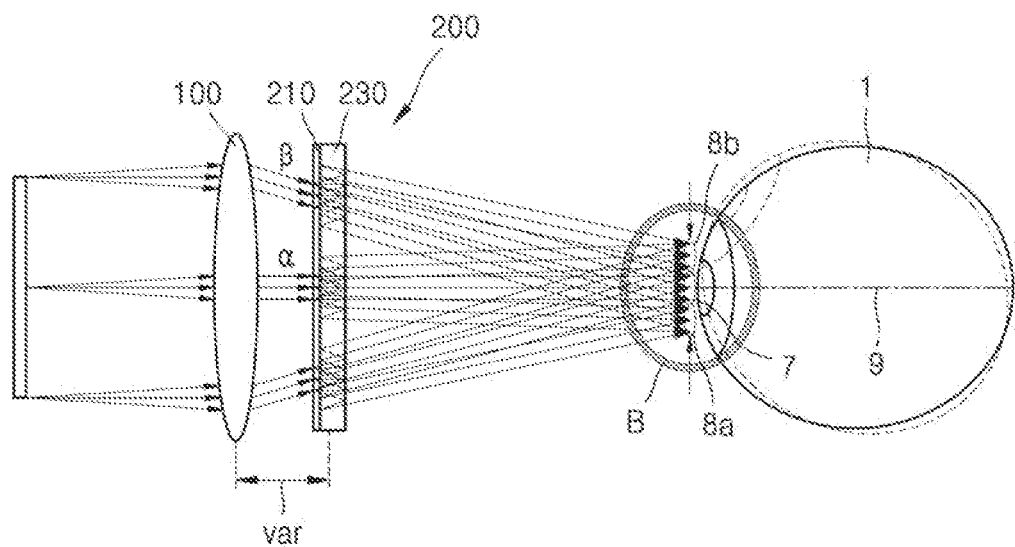
FIG. 2C illustrates the exit pupil expander used together with a visual optical apparatus according to an example embodiment.

FIG. 2B illustrates the propagation of light in an exit pupil expander 200 for enlarging an eye box according to an example embodiment, and FIG. 2C illustrates the exit pupil expander 200 used together with a visual optical apparatus 100 according to an example embodiment.

Referring to FIGS. 2B and 2C, a light beam output from the visual optical apparatus 100 to the diffraction grating 210 may travel in three directions, for example, may be diffracted into three diffraction orders. That is, "0," "+1," and "−1" order diffracted light beams may propagate in a waveguide 230 toward a second surface 234 of the waveguide 230 which is opposite a first surface 232 of the waveguide 230 on which a diffraction grating 210 is formed. Narrow parallel rays (a) and (b) and narrow parallel rays α and β that are incident on the diffraction grating 210 are shown in FIGS. 2B and 2C.

The "0" order diffracted light beam, which is incident on the second surface 234 of the waveguide 230, may pass through the second surface 234 and completely exit the waveguide 230 without being totally reflected because the "0" order diffracted light beam does not satisfy total internal reflection (TIR) conditions. "0" order diffracted rays from the parallel rays α and β may all be collected at the pupil of the eye 1 as illustrated in FIG. 2C, and may form an exit pupil 7 in an eye box B as illustrated in FIG. 2C.

The "+1" and "−1" order diffracted light beams, which are incident on the second surface 234 of the waveguide 230, may be totally internally reflected back to the diffraction grating 210 via the inside of the waveguide 230 because the "+1" and "−1" order diffracted light beams satisfy total internal total reflection conditions. The "+1" and "−1" order diffracted light beams may be deflected by a certain angle when being diffracted by the diffraction grating 210 and/or being totally reflected by the second surface 234. The "+1" and "−1" order diffracted light beams may be incident again on the diffraction grating 210 at a deflected angle.

Each of the "+1" and "−1" order diffracted light beams may be split again into a plurality of diffraction orders by the diffraction grating 210. Since the diffraction grating 210 splits an incident light beam into three diffraction orders as described above, each of the "+1" and "−1" order diffracted light beams may be diffracted again by the diffraction grating 210 into diffraction orders "0," "+1," and "−1."

The "0" order diffracted light beams of the secondly diffracted light beams may exit the waveguide 230, and the "+1" and "−1" order diffracted light beams of the secondly diffracted light beams may propagate in the waveguide 230 after being deflected by a certain angle.

The "+1" and "−1" order diffracted light beams may be incident again on the diffraction grating 210 at a deflected angle. Then, the "+1" and "−1" order diffracted light beams may be diffracted by the diffraction grating 210 according to the characteristics of the diffraction grating 210. The diffraction grating 210 may repeatedly diffract incident light beams until the light beams are incident at a certain angle or greater, and the waveguide 230 may output light beams which are incident at an angle less than a certain angle and may totally reflect light beams which are incident at an angle equal to or greater than the certain angle.

For example, the "+1" order diffracted light beams from the diffraction grating 210 are totally reflected by the second surface 234 of the waveguide 230 back to the diffraction grating 210. Each of the "+1" order diffracted light beams are diffracted by the diffraction grating 210 into diffraction orders "0," "+1," and "−1," and then the "0" order diffracted light beams may be output from the waveguide 230 because the "0" order diffracted light beams do not satisfy total reflection conditions of the second surface 234 of the waveguide 230. The light output from the waveguide 230 may form a first exit pupil order 8a which may be an exit pupil formed by light which is diffracted at least twice by the diffraction grating 210 and is then output from the waveguide 230.

The "+1" and "−1" order diffracted light beams reflected by the second surface 234 of the waveguide 230 are incident again on the diffraction grating 210 and are thirdly diffracted, and "0" order diffracted light beams of the thirdly diffracted light beams pass through the second surface 234 of the waveguide 230 and may form an additional exit pupil order 8. The additional exit pupil order 8 may be formed in a region adjacent to the first exit pupil order 8a in a direction away from the exit pupil 7.

Similar to the "+1" order diffracted light beams, portions of "−1" order diffracted light beams may form a second exit pupil order 8b after repeatedly undergoing total reflection, diffraction, refraction, transmission, and the like. The second exit pupil order 8b may be formed at a position opposite the first exit pupil order 8a based on the exit pupil 7.

The rest portions of the "−1" order diffracted light beams may form an additional exit pupil order 8b after repeatedly undergoing total reflection, diffraction, refraction, transmission, and the like. The additional exit pupil order 8b formed by the rest portions of the "−1" order diffracted light beams may be formed in a region adjacent to the second exit pupil order 8b in a direction away from the exit pupil 7. The formation of additional second exit pupil orders 8b may increase the exit pupil orders 8.

In addition, due to the nature of the propagation mode of the waveguide 230, optical interaction may occur between the diffraction grating 210 and the waveguide 230, and thus light output from the waveguide 230 may correctly correspond to incident light. For example, the waveform of light at an exit end of the exit pupil expander 200 may be the same as the waveform of light at an entrance end of the exit pupil expander 200.

As shown in FIG. 2C, an eye box B as indicated by a circle for clarity may include an exit pupil 7 and a plurality of exit pupil orders 8 that include exit pupil orders 8a and exit pupil orders 8b. The number of exit pupil orders 8 may be varied depending on the needs of the visual optical apparatus 100.

The number of exit pupil orders 8 may be selected depending on the number of exit pupils 7 obtained using the visual optical apparatus 100 without the exit pupil expander 200 and the number of exit pupils 7 needed for proper operations of the visual optical apparatus 100.

The number of exit pupil orders 8 required to enlarge the eye box B may be determined by changing the parameters of the diffraction grating 210 and the parameters of the waveguide 230, for example, parameters for enlarging the eye box B.

The number of exit pupil orders 8 corresponding to a degree of increase in the exit pupil orders 8 may be controlled by the thickness of the waveguide 230 and the angle of diffraction. For example, the number of exit pupil orders 8 may increase as the thickness of the waveguide 230 decreases and the angle of diffraction decreases. The distance between the exit pupil orders 8 may be determined by the thickness and material of the waveguide 230. For example, the distance between the exit pupil orders 8 may decrease as the thickness of the waveguide 230 decrease, and may increase as the refractive index of the waveguide 230 increases. The emission intensity of each of the exit pupil orders 8 for enlarging the eye box B may depend on the diffraction intensity of the diffraction grating 210. For example, the emission intensity of each of the exit pupil orders 8 may be proportional to the diffraction intensity of the diffraction grating 210. When correctly designed for enlarging the eye box B, the exit pupil expander 200 may form a predetermined number of exit pupil orders 8. Therefore, the degree of enlargement may be controlled in a process of manufacturing the exit pupil expander 200.

The material of the waveguide 230 included in the exit pupil expander 200 may include, for example, optically colorless glass, and the refractive index of the waveguide 230 may be selected depending on the number of required exit pupil orders 8. For example, the higher the refractive index of the waveguide 230 that is formed of, for example, flint glass, the greater the angle of total internal reflection in the waveguide 230, such that the exit pupil orders 8 may be arranged farther from each other. In addition, the lower the refractive index of the waveguide 230 that is formed of, for example, crown glass, the smaller the angle of total internal reflection in the waveguide 230, such that the exit pupil orders 8 may be arranged closer to each other.

The above-described principle of light propagation may be observed from individual narrow beams, for example the first parallel beam (a) and the second parallel beam (b) in FIG. 2B, and $\alpha$ and $\beta$ in FIG. 2C which are incident on the exit pupil expander 200.

The exit pupil expander 200 may not be sensitive to the distance from the visual optical apparatus 100, an offset distance var as shown in FIG. 2C because the offset distance var may not affect the angle of incidence of light which travels from the visual optical apparatus 100 onto the exit pupil expander 200 configured to enlarge the eye box B. For example, the angle of incidence of light onto the exit pupil expander 200 is dependent on the exit angle of the light from the visual optical apparatus 100. The visual optical apparatus 100 integrated with the exit pupil expander 200 may form images ranging from the best viewing distance to infinity.

The degree of rotation about an optical axis 9 does not affect the angle of incidence to the diffraction grating 210. The parameters of the exit pupil expander 200 are designed according to the angle of incidence to the exit pupil expander 200 which is determined by the visual optical apparatus 100, and it is sufficient that the angle of incidence to the exit pupil expander 200 is within the aperture angle of the visual optical apparatus 100, for example, within the angle of view of the visual optical apparatus 100.

In general, the eye box B may be enlarged, increased, and/or repeated as shown in FIG. 2C. An image of an object may be formed by the visual optical apparatus 100 such as an AR device, a microscope eyepiece, a telescope, or a sight, and may then be transmitted to the eye 1 in which the image is formed on the retina. For example, light reflected from the object passes through the visual optical apparatus 100 and enters the pupil 1a in which the light is focused on the retina 1.

To enlarge the eye box B output from the visual optical apparatus 100, the exit pupil expander 200 may be arranged at an exit side of the visual optical apparatus 100 along a path of light, and the exit pupil expander 200 may split a light beam into at least two light beams which may each form an exit pupil 7 and an exit pupil order 8. Thus, an exit pupil 7 output from the visual optical apparatus 100 may be increased (enlarged) to form the eye box B.

The exit pupil expander 200 may be used with an optical device, for example, the visual optical apparatus 100, configured to form images which range from the best viewing distance to infinity.

In the waveguide mode, the loss of light propagating in the waveguide 230 may be very small. Therefore, in an example embodiment, since the exit pupil expander 200 includes the diffraction grating 210 used for receiving and outputting light and the waveguide 230 used in the waveguide mode, the exit pupil expander 200 may result in substantially no loss of light. For example, all light output from the visual optical apparatus 100 may be in the form of exit pupil orders 8 forming the eye box B.

In addition, since the eye 1 is an optical receiver, the visual optical apparatus 100 may emit parallel light. Parallel light entering the eye 1 is focused by the lens of the eye 1, which may be a condensing lens, and thus the user may clearly view the object. When non-parallel light is output from the visual optical apparatus 100, an image formed on the retina of the eye 1 may be blurred. The image may be formed in front of or behind the retina instead of being formed on the retina. Light output from the visual optical apparatus 100 in the form of parallel light may be in the form of parallel light even after passing through the exit pupil expander 200 which is provided according to an example embodiment.

The exit pupil expander 200 may be applied to the visual optical apparatus 100 which uses single-spectrum light and multi-spectrum light for forming color images. The reason for this is that the diffraction grating 210 is used to input light to the waveguide 230 and output the light from the waveguide 230, and the waveguide 230 satisfies the waveguide mode. Thus, a light beam incident on the exit pupil expander 200 may be output from the exit pupil expander 200 as a plurality of light beams without variations in the optical characteristics thereof, and an exit pupil 7 and a plurality of exit pupil orders 8 may be formed by the plurality of light beams.

The exit pupil expander 200 may operate in a transmissive mode as illustrated in FIG. 2C, but is not limited thereto. For example, the exit pupil expander 200 may also operate in a reflective mode.

Figure 2D:
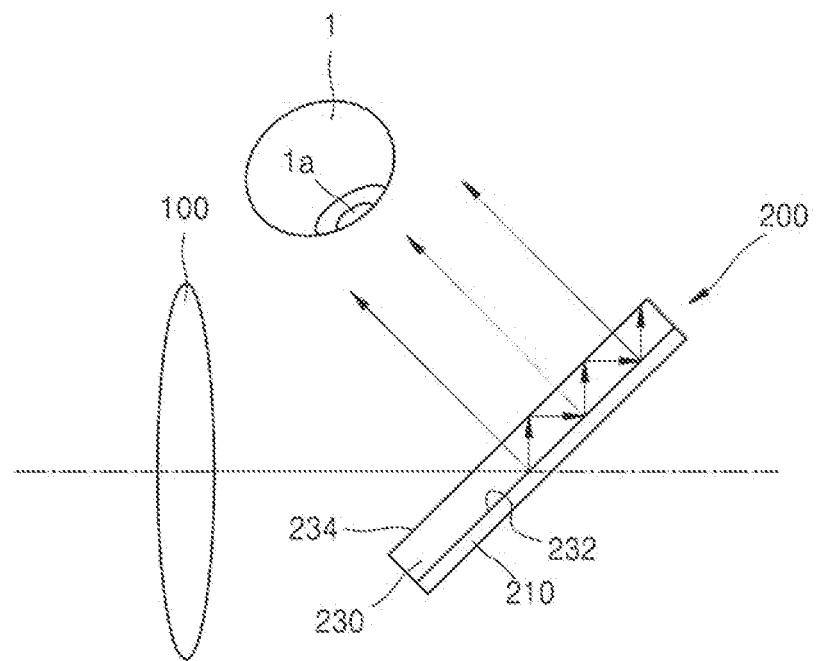
FIG. 2D illustrates an exit pupil expander operating in a reflective mode according to an example embodiment.

FIG. 2D illustrates an exit pupil expander 200 operating in a reflective mode according to an example embodiment.

As shown in FIG. 2D, a light beam, for example, a parallel light beam from a visual optical apparatus 100 may be incident on a second surface 234 of a waveguide 230 corresponding to a first surface 232 of the waveguide 230 on which a reflective diffraction grating 210 is formed.

The parallel light beam may be refracted in the waveguide 230 and may be obliquely incident on the reflective diffraction grating 210.

The parallel light beam may be diffracted into three diffraction orders "0," "+1," and "−1" by the reflective diffraction grating 210 and may then propagate in three directions in the waveguide 230.

The "0" order diffracted light beam which propagates in the waveguide 230 and is incident on the second surface 234, for example, a portion of the parallel light beam which is diffracted once, does not satisfy total internal reflection conditions and may thus be output from the waveguide 230 through the second surface 234 without being totally reflected by the second surface 234.

The "0" order diffracted light beam may be collected in a portion of a pupil area of the eye 1 and may form an exit pupil 7 in an eye box B similar to the operation in the transmissive mode.

The "+1" and "−1" order diffracted light beams satisfy total reflection conditions of the second surface 234 and may thus totally reflected by the second surface 234 and propagate in the waveguide 230 as described in the description of the exit pupil expander 200 operating in the transmissive mode.

The "+1" and "−1" order diffracted light beams are incident again on the reflective diffraction grating 210, and each of "+1" and "−1" order diffracted light beams is diffracted into diffraction orders "+1," "0," and "−1." The "0" order diffracted light beams which are secondly diffracted light beams are output from the waveguide 230 through the second surface 234 and form an exit pupil order 8, and the other light beams propagate again in the waveguide 230.

The light beams propagating in the waveguide 230 may be repeatedly diffracted, transmitted, totally reflected, and refracted until the light beams are incident on the reflective diffraction grating 210 at an angle of incidence at which the light beams are not diffracted by the reflective diffraction grating 210, and then the light beams may additionally form exit pupil orders 8.

Similar to the operation of the exit pupil expander 200 in the transmissive mode, the eye box B formed by the exit pupil expander 200 operating in the reflective mode is formed by the exit pupil 7 and a set of exit pupil orders 8. As described above, the number of orders of the exit pupil 7 may be arbitrary. For example, the number of orders of the exit pupil 7 may be equal to the number required by a visible optical system to which the exit pupil expander 200 is applied, and the degree of increase of exit pupil orders 8 may be determined by the parameters of the exit pupil expander 200, for example, the parameters of the reflective diffraction grating 210 and the parameters of the waveguide 230.

As described above, the principle of propagation of light in the exit pupil expander 200 in which the reflective diffraction grating 210 for enlarging the eye box B is used is similar to the principle of propagation of light in the exit pupil expander 200 in which a transmissive diffraction grating 210 is used. The difference is the orientation of the exit pupil expander 200 with respect to an optical axis.

In the case of the exit pupil expander 200 operating in the transmissive mode, light may first propagate through the transmissive diffraction grating 210, and the eye box B may be formed behind the exit pupil expander 200 as shown in FIG. 2C. In the case of the exit pupil expander 200 operating in the reflective mode, light may first be incident on the waveguide 230 and may be refracted in the waveguide 230, and may then be incident on the reflective diffraction grating 210. The eye box B may be formed in front of the exit pupil expander 200 as shown in FIG. 2D.

The field of view of a visual optical system in which the exit pupil expander 200 was applied to a visual optical apparatus 100 was measured together with the field of view of a visual optical system in which the exit pupil expander 200 is not applied to a visual optical apparatus 100. As a result of the measurement, the field of view of the visual optical system to which the exit pupil expander 200 was applied was equal to or greater than about 5 times the field of view of the visual optical system to which the exit pupil expander 200 was not applied.

In addition, since light propagates a relatively short distance in the waveguide 230 of the exit pupil expander 200, the loss of optical energy may be reduced.

The high diffraction efficiency of the exit pupil expander 200 allows light to be more uniformly filled in the eye box B.

Figure 3:
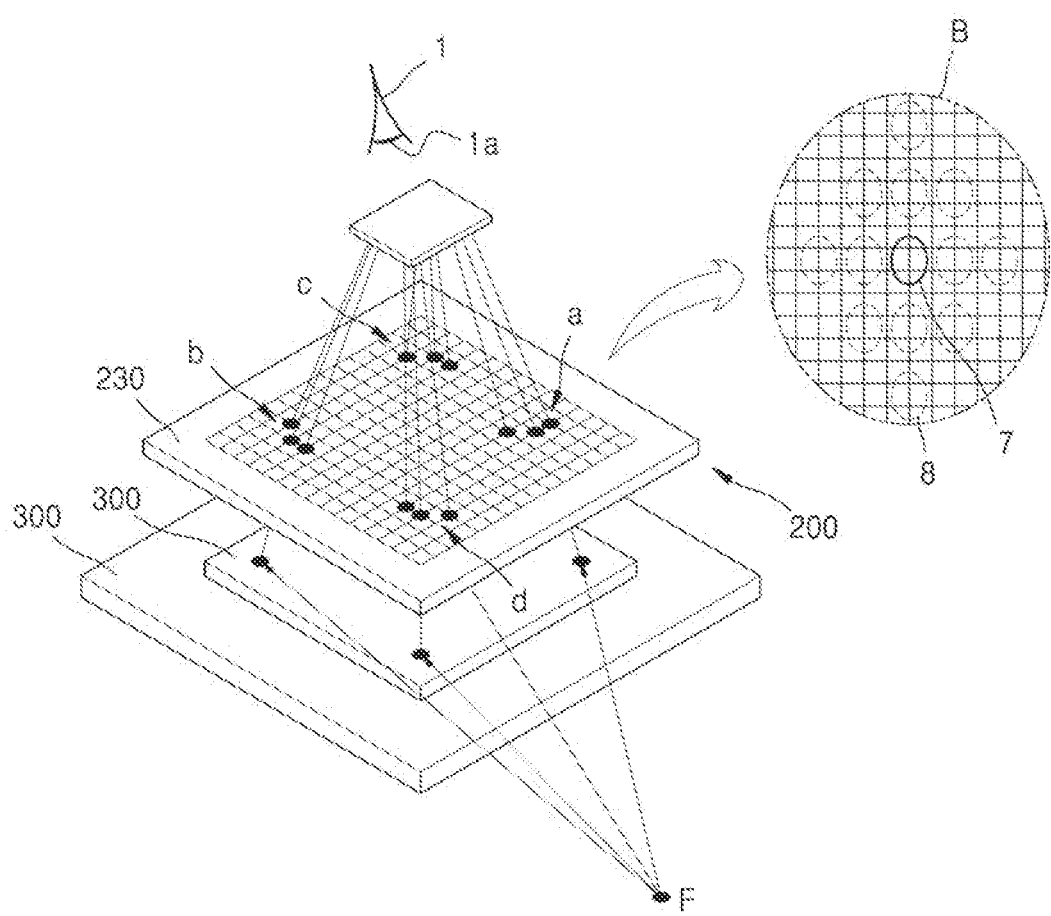
FIG. 3 is a perspective view illustrating a display using an exit pupil expander according to an example embodiment.

FIG. 3 is a perspective view illustrating a display using an exit pupil expander 200 according to an example embodiment. The display illustrated in FIG. 3 may be an AR device of a near-eye display type.

Light emitted from an image source F, for example, an internal display may enter a combining apparatus 300 which combines an environment image with an image formed by the image source F. The combining apparatus 300 may correspond to the visual optical apparatus 100 described with reference to FIGS. 1, 2B, etc. The combining apparatus 300 may redirect the light to an exit pupil expander 200 to form the size of a field of view of the AR and enlarge an eye box B.

The exit pupil expander 200 may increase the eye box B of the AR device as described above. Light output from various regions, for example, a, b, c, and d of FIG. 3 of the exit pupil expander 200 may be redirected to the eye 1 at various angles. The light output from the exit pupil expander 200 may completely and uniformly fill the eye box B including an exit pupil 7 and exit pupil orders 8. This is because light propagates from the AR device through the exit pupil expander 200. In this case, the exit pupil expander 200 for the AR device may use a two-dimensional diffraction grating 210, and the eye box B may be two-dimensional. For example, the eye box B may extend on the same plane in two directions perpendicular to each other.

When the combining apparatus 300 includes a holographic optical element, the combining apparatus 300 may have a small eye box B. To enlarge the eye box B of the combining apparatus 300, the exit pupil expander 200 according to an example embodiment may be used.

Figure 4A:
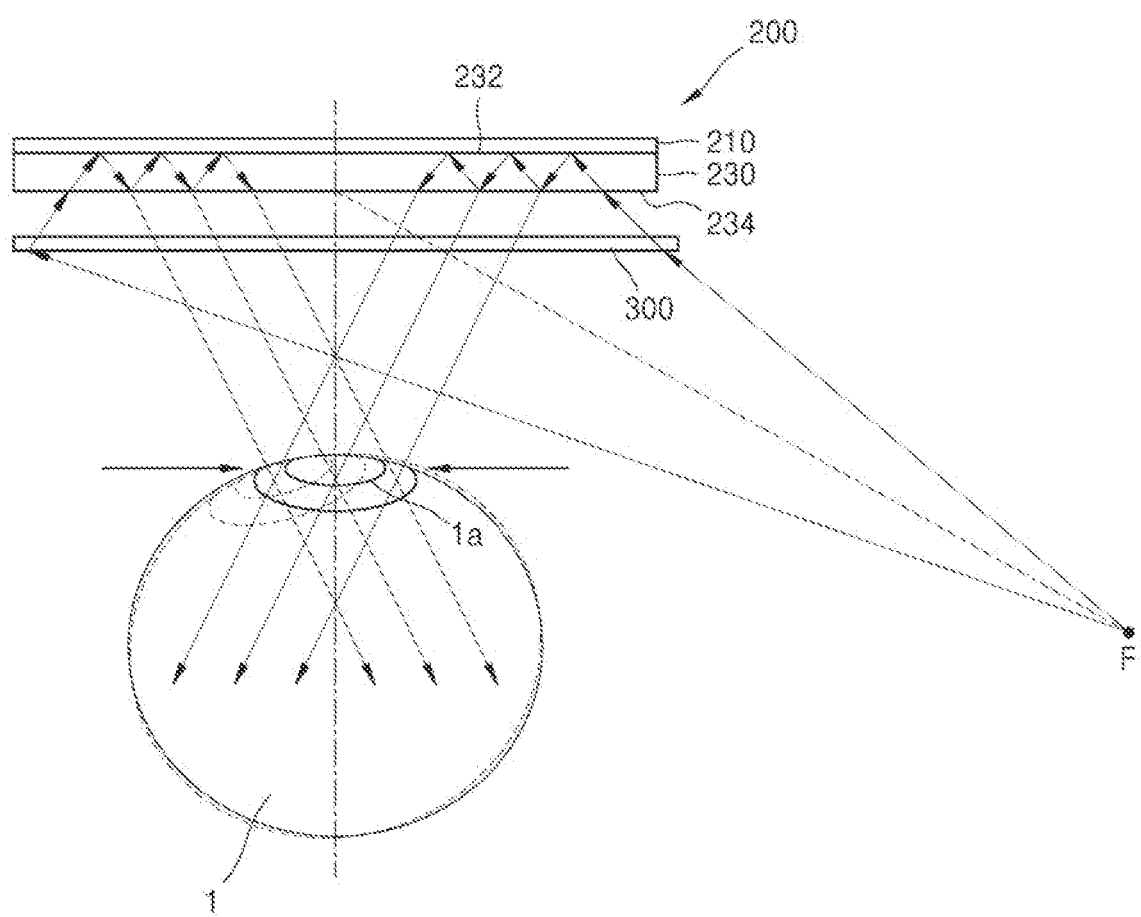
FIG. 4A illustrates a combining apparatus operating in a transmissive mode and an exit pupil expander according to an example embodiment.

FIG. 4A illustrates a combining apparatus 300 operating in a transmissive mode and an exit pupil expander 200 according to an example embodiment. The combining apparatus 300 and the exit pupil expander 200 shown in FIG. 4A may be integrated into an AR device which is a display. The AR device may be of a glasses type. The combining apparatus 300 may be a hologram optical element. Images may be formed behind the combining apparatus 300, that is, on a side opposite the highlighted side of the combining apparatus 300. The exit pupil expander 200 may be arranged behind the combining apparatus 300 which is closer to the eye 1. For example, the combining apparatus 300 may be arranged between the exit pupil expander 200 and the eye 1.

Light emitted from an image source F may be incident on the combining apparatus 300, and the angle of view of the combining apparatus 300 may be formed by inclined parallel light. Light output from the combining apparatus 300 may be incident on the exit pupil expander 200 and may form an exit pupil and a plurality of exit pupil orders as described above. Light output from the exit pupil expander 200 may propagate while passing through the combining apparatus 300 without interaction with the combining apparatus 300. That is, the combining apparatus 300 may not affect the propagation of light which is output from the exit pupil expander 200 and correspond to the exit pupil and the exit pupil orders.

Figure 4B:
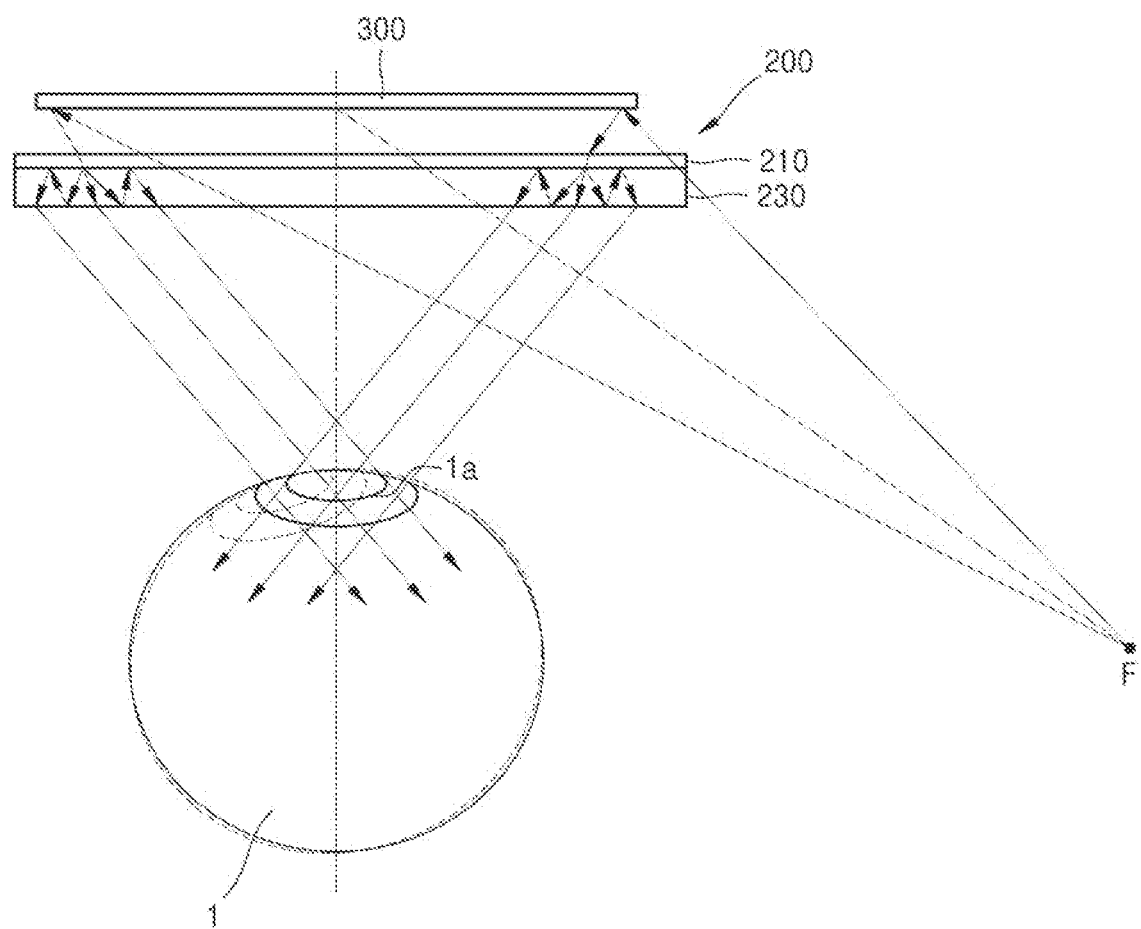
FIG. 4B illustrates a relationship between a combining apparatus operating in a reflective mode and an exit pupil expander according to an example embodiment.

FIG. 4B illustrates a relationship between a combining apparatus 300 operating in a reflective mode and an exit pupil expander 200 according to an example embodiment. For example, an image produced by the combining apparatus 300 may be formed in front of the combining apparatus 300 at the same side as an image source F. In this case, the exit pupil expander 200 may also be arranged in front of the combining apparatus 300, and thus, the exit pupil expander 200 may be closer to the eye 1 than the combining apparatus 300 is to the eye 1. In addition, the combining apparatus 300 may form an angle of view, and the exit pupil expander 200 may enlarge an eye box B by forming additional exit pupil orders 8.

The exit pupil expander 200 may be relatively compact and may be more easily be integrated into an AR device without substantial increases in the overall dimensions and weight of the AR device.

FIG. 5 illustrates an exit pupil expander 200 including a one-dimensional diffraction grating 210 according to an example embodiment. As shown in FIG. 5, when the exit pupil expander 200 includes the one-dimensional diffraction grating 210, light emitted from a visual optical apparatus 100 may be incident on the exit pupil expander 200 and diffracted by the exit pupil expander 200. Light propagating from the visual optical apparatus 100 and light diffracted by the exit pupil expander 200 may be on the same plane.

As described above, a "0" order diffracted light beam may pass through the exit pupil expander 200, and due to total reflection in a waveguide 230 of the exit pupil expander 200, "+1" and "−1" order diffracted light beams may propagate along a Y axis direction in the and return to the one-dimensional diffraction grating 210 at which each of the "+1" and "−1" order diffracted light beams may be diffracted into diffraction orders "0," "+1," and "−1."

The "0" order diffracted light beams of the secondly diffracted light beams may not satisfy total reflection conditions and may thus pass through the waveguide 230 to form exit pupil orders. As described above, light may be output from the exit pupil expander 200 after undergoing diffraction, total reflection, refraction, and the like in the exit pupil expander 200, and may then form additional exit pupil orders in the Y-axis direction. For example, an exit pupil area may be enlarged only in one direction.

A two-dimensional diffraction grating may form exit pupil orders 8 in two orthogonal directions. FIG. 6 is a view schematically illustrating an exit pupil expander 200 including a two-dimensional diffraction grating 210 according to an example embodiment. As shown in FIG. 6, when the exit pupil expander 200 includes the two-dimensional diffraction grating 210, light emitted from a visual optical apparatus 100 may be incident on the exit pupil expander 200 and diffracted by the exit pupil expander 200 in two directions along X and Y axes. The operational principle of the two-dimensional diffraction grating 210 is the same as the operational principle of the one-dimensional diffraction grating 210, but the two-dimensional diffraction grating 210 may enlarge an eye box B in two directions. For example, the eye box B may extend to two coordinates.

Figure 7:
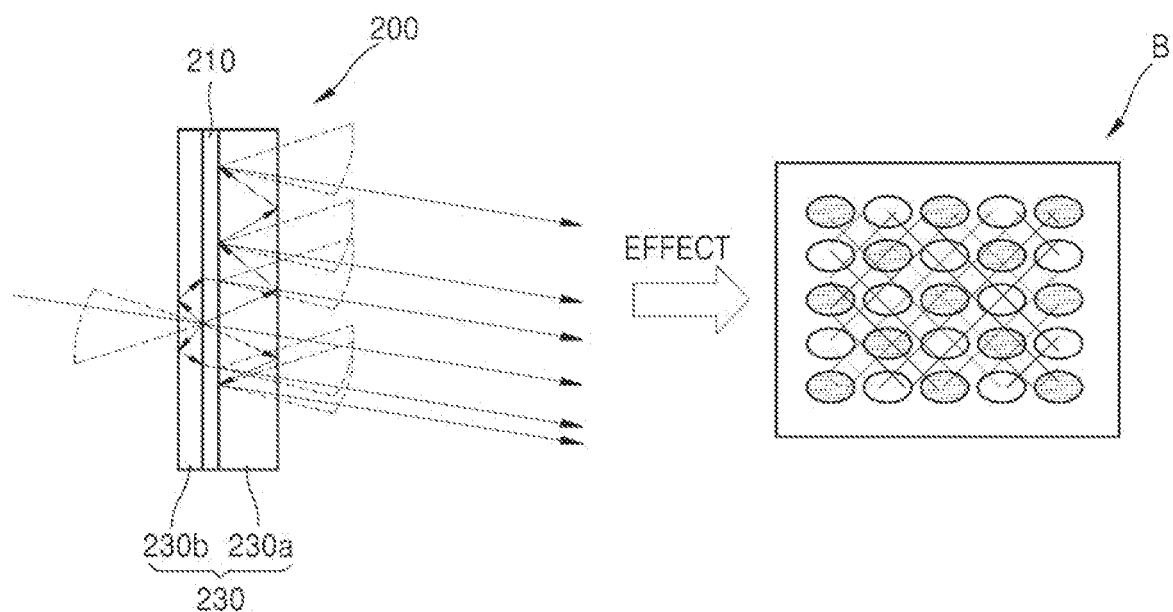
FIG. 7 illustrates an exit pupil expander according to another example embodiment.

FIG. 7 illustrates an exit pupil expander 200 according to another example embodiment. As shown in FIG. 7, a diffraction grating 210 may be located inside a waveguide 230. For example, the exit pupil expander 200 may include a first waveguide 230a, a second waveguide 230b, and the diffraction grating 210 arranged between the first waveguide 230a and the second waveguide 230b. Both ends of the diffraction grating 210 may be respectively in contact with the first waveguide 230a and the second waveguide 230b. Light incident on the diffraction grating 210 through the first waveguide 230a may be split into two parts.

A portion of light incident on the diffraction grating 210 may be transmitted through the diffraction grating 210 while being diffracted by the diffraction grating 210 and may propagate in the first waveguide 230a. The light propagating in the first waveguide 230a is light of diffraction orders "0," "+1," and "−1," and the "0" order diffracted light passes through the first waveguide 230a and forms an exit pupil. The "+1" and "−1" order diffracted light may repeatedly undergo total reflection, refraction, diffraction, transmission, and the like and may form additional exit pupil orders.

The other portion of light incident on the diffraction grating 210 may be reflected by the diffraction grating 210 while being diffracted by the diffraction grating 210 and may propagate in the second waveguide 230b. The diffracted light propagating in the second waveguide 230b may be totally internally reflected in the second waveguide 230b and then be incident again on the diffraction grating 210. A portion of the light may pass through the diffraction grating 210 and the rest portion of the light may be reflected by the diffraction grating 210.

The portion of the light passing through the diffraction grating 210 may propagate in the first waveguide 230a and may form additional exit pupil orders. The rest portion of the light reflected by the diffraction grating 210 to the second waveguide 230b may propagate into the first waveguide 230a while repeatedly undergoing total reflection, diffraction, and the like. Owing to the first waveguide 230a, light may be uniformly distributed to the exit pupil orders.

Figure 8A:
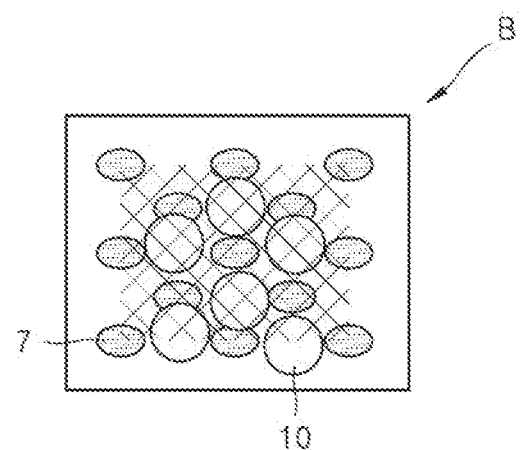
FIG. 8A illustrates an eye box including a plurality of exit pupil orders which are discretely distributed.

FIG. 8A illustrates an eye box B including a plurality of exit pupil orders which are discretely distributed. Light output from a visual optical apparatus may form a plurality of exit pupils 7. The exit pupils 7 formed by the visual optical apparatus may be non-uniformly and discretely distributed in the eye box B as shown in FIG. 8A. Thus, blind regions 10 may be formed in the eye box B, and since no exit pupil order is formed in the blind regions 10, a user may not view an image when the eye of the user is at the blind regions 10.

According to an example embodiment, an exit pupil expander may form and increase exit pupil orders. The resolution of the eye box B corresponding to the number of exit pupil orders increased by the exit pupil expander may vary according to the following two parameters: the diffraction angle of a diffraction grating, for example, the angle of incidence of light onto a waveguide 230, and the thickness and material of the waveguide, for example, a total internal reflection angle.

The number of total reflections in the waveguide and the degree of discontinuity of the exit pupil orders may be adjusted by combining the two parameters. For example, the smaller the diffraction angle of the diffraction grating 210 or the smaller the total internal reflection angle of the waveguide, the greater the resolution of the eye box B.

Figure 8B:
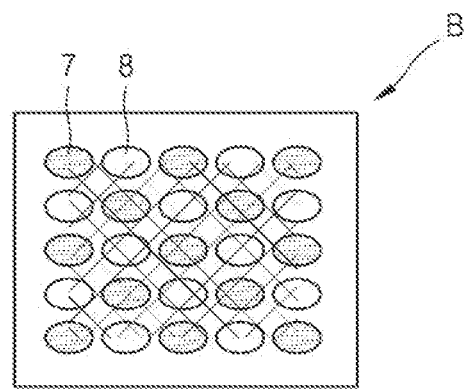
FIG. 8B illustrates exit pupil orders formed by an exit pupil expander according to an example embodiment.

FIG. 8B illustrates exit pupil orders 8 formed by an exit pupil expander according to an example embodiment. According to an example embodiment, the exit pupil expander may increase the exit pupil orders 8 through diffraction, transmission, refraction, total reflection, and the like. The exit pupil orders 8 may be formed such that the exit pupil orders 8 may at least partially overlap each other. Referring to FIG. FIG. 8B, as the number of exit pupil orders 8 increases and an eye box B is filled with the exit pupil orders 8, the discreteness of the eye box B may decrease, and the eye box B may be more uniform.

In addition, the light energy may be more uniform in the exit pupils 7 and the exit pupil order 8 for the uniformity of images. Without the exit pupil orders 8, the eye 1 may view a very bright image at one position and a very faint image at another position.

The uniformity of light energy in the exit pupils 7 and the exit pupil orders 8 may be guaranteed by optimizing the parameters of a diffraction grating. To this end, during manufacture, the period of the diffraction grating 210 may be selected such that light at an incident point of an exit pupil expander may match light at an exit point of the exit pupil expander. Further, the relief height of the diffraction grating may be selected such that exit pupils 7 and exit pupil orders 8 may have uniformly brightness and the same dimensions. The exit pupil expander may have an angular range for accurate operations. The angular range may be equal to or greater than the angle of view of a visual optical apparatus, for example, the aperture angle of a visual optical apparatus.

For example, when an exit pupil expander according to an example embodiment is designed to operate within an aperture angle range of about 60° or less, the exit pupil expander may be used together with a visual optical apparatus having an angle of view within the range of less than about 60°, for example, 40°. However, the exit pupil expander may not be used together with a visual optical apparatus having an angle of view greater than about 60° because the exit pupil expander may not properly operate.

When the exit pupil expander includes a planar waveguide, a diffraction grating of any type may be applied to the planar waveguide. In this case, however, the planar exit pupil expander 200 may be generally useful for a visual optical apparatus having a small field of view.

Figure 9:
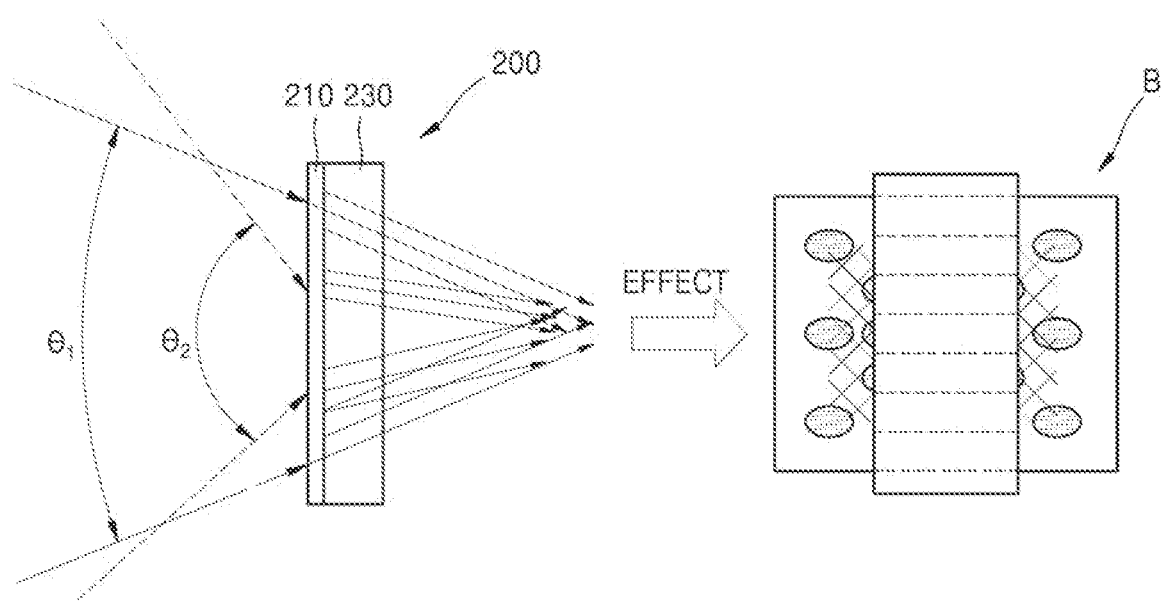
FIG. 9 illustrates a flat exit pupil expander forming a spot according to an example embodiment.

FIG. 9 illustrates a flat exit pupil expander 200 forming a spot according to an example embodiment.

As shown in FIG. 9, light beams providing different angles of view may be incident on the exit pupil expander 200. For example, a first light beam such as an image may be incident on the exit pupil expander 200 with a first angle of view $\theta_1$, and a second light beam such as a flare may be incident on the exit pupil expander 200 with a second angle of view $\theta_2$. In addition, the aperture angle of the exit pupil expander 200 may be equal to the first angle of view $\theta_1$. When the first light beam is incident on the exit pupil expander 200, the exit pupil expander 200 may form an exit pupil 7 and a plurality of exit pupil orders 8 in an eye box B by using the first light beam.

In addition, when the second light beam is incident on the exit pupil expander 200 with the second angle of view $\theta_2$ which is greater than the aperture angle of the exit pupil expander 200, for example, the first angle of view $\theta_1$, the exit pupil expander 200 may not form exit pupil orders 8 using the second light beam. Thus, the exit pupil expander 200 may form a rainbow spot in the eye box B as shown in FIG. 9. Although the second light beam generated by an additional light source, for example, a street light, an automobile car headlight, etc. can be shown through the visual optical apparatus 100, the second light beam may be diffracted by a diffraction grating 210 of the exit pupil expander 200 but may not be multiplied by a waveguide 230 of the exit pupil expander 200 such that the second light beam may be shown in the form of a spectrum, for example, a rainbow. This phenomenon may be observed when the exit pupil expander 200 is used in AR glasses having a small eye box.

Figure 10:
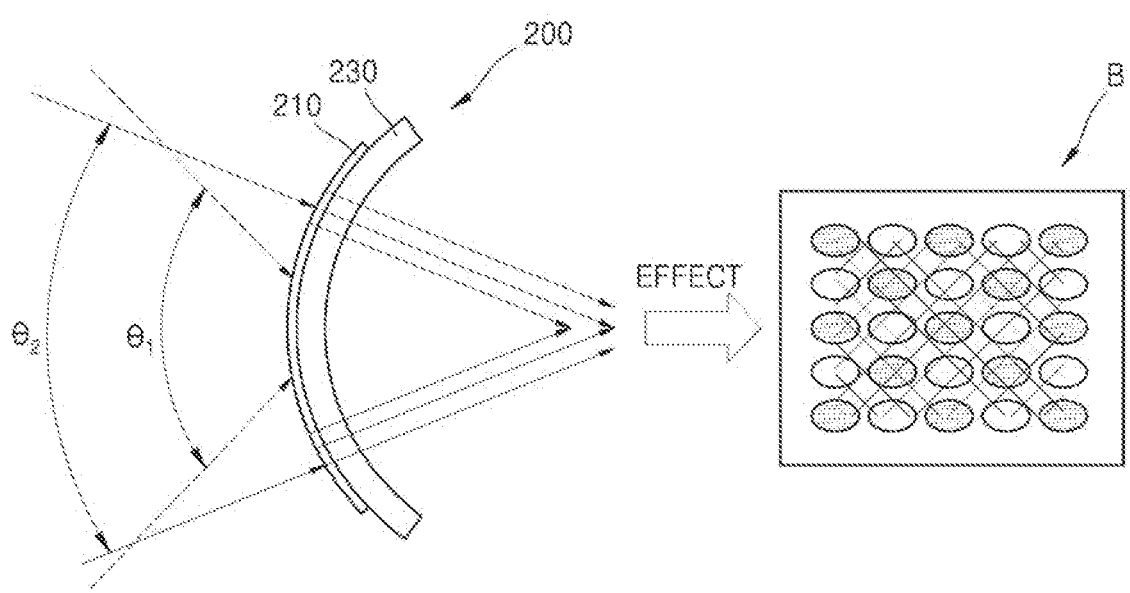
FIG. 10 illustrates a curved exit pupil expander according to an example embodiment.

FIG. 10 illustrates a curved exit pupil expander 200 according to an example embodiment.

Due to the change in the shape of the curved exit pupil expander 200, the curved exit pupil expander 200 may be implemented to operate only at a specific aperture angle. That is, the curvature of the curved exit pupil expander 200 may be designed to select an aperture angle.

The curved exit pupil expander 200 may include a curved diffraction grating 210 and a curved waveguide 230 as shown in FIG. 10. A first light beam incident on the curved exit pupil expander 200 within the range of a first aperture angle $\theta_1$ may be in a direction perpendicular to the curved exit pupil expander 200. This is because the curved exit pupil expander 200 has curvature variable or adjustable within the range of a parameter, for example, an intended aperture angle which is the range of an angle of incidence may be set by a visual optical apparatus designed for use.

The first light beam incident within the range of the first aperture angle $\theta_1$ may be diffracted by the curved diffraction grating 210, and the curved waveguide 230 may form an exit pupil and exit pupil orders using the diffracted light beam to enlarge an eye box B. However, a second light beam incident at a second aperture angle $\theta_2$ greater than the first aperture angle $\theta_1$ may not form the eye box B. Although the curved diffraction grating 210 diffracts the second light beam incident at the second aperture angle $\theta_2$, the diffracted light beam is not output from the curved waveguide 230 after being totally reflected in the curved waveguide 230.

When the curved exit pupil expander 200 uses the curved waveguide 230, a Bragg diffraction grating may be used as the curved diffraction grating 210. The Bragg diffraction grating may have high diffraction efficiency. In addition, the Bragg diffraction grating may have selectivity for the angle of incidence and wavelength of light.

A Bragg diffraction grating may also be used for a planar waveguide or a planar exit pupil expander when it is intended to increase the efficiency of light incident at a specific angle with the range of the angle of view of a visual optical apparatus. Thus, light incident perpendicularly on to the Bragg diffraction grating may be output with relatively small energy loss, and light incident obliquely on the Bragg diffraction grating may be output with relatively large energy loss.

When a volume Bragg grating is used as the curved diffraction grating 210, the efficiency of light incident at a specific angle from a visual optical apparatus may be further increased.

The curved exit pupil expander 200 of the example embodiment may be integrated into a visual optical apparatus having a large viewing angle. A flat exit pupil expander has a limit to the angle of incidence of light for enlarging an eye box. Thus, when the angle of view of the visual optical apparatus exceeds the limit of the aperture angle of the flat exit pupil expander, the flat exit pupil expander may not properly enlarge the eye box. However, since the curved exit pupil expander 200 may increase or adjust the aperture angle thereby according to the curvature thereof, the curved exit pupil expander 200 may be applied even to a visual optical apparatus having a large angle of view.

In addition, the aperture angle of a flat exit pupil expander may be increased using a plurality of waveguides. FIG. 11 illustrates an exit pupil expander including a plurality of waveguides according to another example embodiment. As illustrated in FIG. 11, a region of a diffraction grating 210 may be designed to diffract a first light beam incident with the range of a first opening angle $\theta_1$, and the rest region of the diffraction grating 210 may be designed to diffract light incident within the range of a second aperture angle $\theta_2$ greater than the first aperture angle $\theta_1$. Parameters of the diffraction grating 210 may be designed according to aperture angles.

A first waveguide 230c forms an exit pupil and exit pupil orders by using a first light beam incident within the range of the first aperture angle $\theta_1$, and a second waveguide 230d may form an exit pupil and exit pupil orders by using a second light beam incident within the range of the first aperture angle $\theta_1$ to the second opening angle $\theta_2$. For example, a plurality of waveguides 230 may be used to widen the angle of view.

As described above, according to the one or more of the above example embodiments, the exit pupil expanders 200 may be applied to various visual optical apparatuses 100 as small and convenient additional elements for enlarging the eye boxes B of the visual optical apparatuses 100.

The exit pupil expanders 200 described above may be universal and may have a compact and slim design with high diffraction efficiency.

The exit pupil expanders 200 are each capable of enlarging an eye box B while maintaining the field of view of the visual optical apparatus 100.

The exit pupil expanders 200 may guarantee the uniformity and brightness of images formed in an exit pupil area.

The exit pupil expanders 200 may be applied to images formed using multiple spectra.

While the displays and exit pupil expanders have been described according to example embodiments with reference to the accompanying drawings, the embodiments are merely examples, and it will be understood by those of ordinary skill in the art that various modifications and other equivalent embodiments may be made therein without departing from the spirit and scope of the present disclosure. Although many items have been stated in the above description, these should be considered as specific examples and should not be considered as limiting the scope of the present disclosure. Thus, the scope and spirit of the present disclosure should be defined not by the descriptions of the example embodiments but by the appended claims.

It should be understood that example embodiments described herein should be considered in a descriptive sense only and not for purposes of limitation. Descriptions of features or aspects within each example embodiment should typically be considered as available for other similar features or aspects in other embodiments. While example embodiments have been described with reference to the figures, it will be understood by those of ordinary skill in the art that various changes in form and details may be made therein without departing from the spirit and scope as defined by the following claims.

What is claimed is:

1. A device configured to enlarge an exit pupil area of a visual optical apparatus, the device comprising:
    a diffraction grating configured to output a plurality of diffracted light beams of a plurality of diffraction orders by diffracting an incident light beam; and
    a waveguide provided on the diffraction grating, the waveguide being configured to form an exit pupil based on a first diffracted light beam among the plurality of diffracted light beams output from the diffraction grating and to form exit pupil orders based on a second diffracted light beam among the plurality of diffracted light beams output from the diffraction grating,
    wherein the waveguide is configured to form the exit pupil by outputting the first diffracted light beam without additional diffraction, and form the exit pupil orders by totally internally reflecting on the waveguide and diffracting on the diffraction grating, at least once, the second diffracted light beam and then outputting the totally internally reflected and diffracted second diffracted light beam,
    wherein the first diffracted light beam comprises a 0 order diffracted light beam,
    wherein the second diffracted light beam comprises a+1 order diffracted light beam and a−1 order diffracted light beam, and
    wherein the waveguide is further configured to form a first exit pupil order based on the +1 order diffracted light beam, and form a second exit pupil order based on the −1 order diffracted light beam.

2. The device of claim 1, wherein the waveguide is further configured to form the exit pupil by outputting, without total reflection, the first diffracted light beam output from the diffraction grating.

3. The device of claim 1, wherein the waveguide is further configured to form at least one exit pupil order by totally internally reflecting, at least once, the second diffracted light beam output from the diffraction grating and then outputting the second diffracted light beam.

4. The device of claim 3, wherein the waveguide is further configured to return the second diffracted light beam to the diffraction grating by totally internally reflecting the second diffracted light beam, wherein the diffraction grating is further configured to diffract the returned second diffracted light beam into a plurality of diffracted light beams, and wherein the waveguide is further configured to form the exit pupil orders by outputting some diffracted light beams of the plurality of diffracted light beams obtained by diffracting the returned second diffracted light beam and reflecting remaining diffracted light beams of the plurality of diffracted light beams, that are not output, back to the diffraction grating.

5. The device of claim 1, wherein the waveguide comprises:
   a first surface on which the diffraction grating is provided; and
   a second surface opposite to the first surface and configured to output the first diffracted light beam to the outside of the waveguide.

6. The device of claim 5, wherein the waveguide is further configured to additionally form exit pupil orders until all diffracted light beams incident on the second surface are totally internally reflected.

7. The device of claim 5, wherein a number of the exit pupil orders is proportional to a number of times that diffracted light beams of the plurality of diffracted light beams incident on the second surface pass through the second surface.

8. The device of claim 5, wherein a distance between the exit pupil orders is proportional to a thickness of the waveguide.

9. The device of claim 5, wherein a distance between the exit pupil orders is inversely proportional to a refractive index of the waveguide.

10. The device of claim 1, wherein the waveguide is further configured to form the first exit pupil order and the second exit pupil order in different directions with respect to the exit pupil provided between the first exit pupil order and the second exit pupil order.

11. The device of claim 1, wherein the diffraction grating is further configured to diffract light beams that are incident at a predetermined aperture angle or less.

12. The device of claim 11, wherein the predetermined aperture angle is greater than an angle of view of the visual optical apparatus.

13. The device of claim 1, wherein the waveguide is a first waveguide, and the device further comprises:
   a second waveguide provided on the diffraction grating and configured to totally internally reflect light output from the diffraction grating.

14. The device of claim 13, wherein the diffraction grating is provided between the first waveguide and the second waveguide.

15. A device configured to enlarge an exit pupil area of a visual optical apparatus, the device comprising:
   a diffraction grating configured to output a plurality of diffracted light beams of a plurality of diffraction orders by diffracting an incident light beam; and
   a waveguide provided on the diffraction grating, the waveguide being configured to form an exit pupil based on a first diffracted light beam among the plurality of diffracted light beams output from the diffraction grating and to form exit pupil orders based on a second diffracted light beam among the plurality of diffracted light beams output from the diffraction grating,
   wherein the diffraction grating comprises:
      a first diffraction region configured to diffract a light beam incident within a range of a first aperture angle or less; and
      a second diffraction region configured to diffract a light beam incident within a range of greater than the first aperture angle but less than or equal to a second aperture angle,
   wherein the waveguide further comprises:
      a first waveguide configured to form an exit pupil order based on a diffracted light beam output from the first diffraction region; and
      a second waveguide configured to form an exit pupil order based on a diffracted light beam output from the second diffraction region.

16. The device of claim 15, wherein the diffraction grating, the first waveguide, and the second waveguide are sequentially provided in a propagation direction of the incident light beam.

17. The device of claim 1, wherein the waveguide comprises a curved waveguide.

18. The device of claim 1, wherein the diffraction grating comprises a Bragg diffraction grating.

19. A display comprising:
   a visual optical apparatus configured to output a light beam with a given angle of view; and
   a device configured to expand an exit pupil area of the visual optical apparatus, the device comprising:
      a diffraction grating configured to output a plurality of diffracted light beams of a plurality of diffraction orders by diffracting an incident light beam; and
      a waveguide provided on the diffraction grating, the waveguide being configured to form an exit pupil based on a first diffracted light beam among the plurality of diffracted light beams output from the diffraction grating and to form exit pupil orders based on a second diffracted light beam among the plurality of diffracted light beams output from the diffraction grating,
   wherein the waveguide is configured to form the exit pupil by outputting the first diffracted light beam without additional diffraction, and form the exit pupil orders by totally internally reflecting on the waveguide and diffracting on the diffraction grating, at least once, the second diffracted light beam and then outputting the totally internally reflected and diffracted second diffracted light beam,
   wherein the first diffracted light beam comprises a 0 order diffracted light beam,
   wherein the second diffracted light beam comprises a+1 order diffracted light beam and a−1 order diffracted light beam, and
   wherein the waveguide is further configured to form a first exit pupil order based on the +1 order diffracted light beam, and form a second exit pupil order based on the −1 order diffracted light beam.

20. The display of claim 19, wherein the display is a near-eye display.

* * * * *